(12) United States Patent
Ihde et al.

(10) Patent No.: US 9,167,889 B1
(45) Date of Patent: Oct. 27, 2015

(54) REVERSIBLE SNOWBRUSH SCRAPER

(71) Applicant: Hopkins Manufacturing Corporation, Emporia, KS (US)

(72) Inventors: David Ihde, Admire, KS (US); Daniel Joseph Weibel, Carl Junction, MO (US); Greg Yotz, Gridley, KS (US); Gary Kaminski, Emporia, KS (US)

(73) Assignee: Hopkins Manufacturing Corporation, Emporia, KS (US)

( * ) Notice: Subject to any disclaimer, the term of this patent is extended or adjusted under 35 U.S.C. 154(b) by 0 days.

(21) Appl. No.: 14/147,231

(22) Filed: Jan. 3, 2014

Related U.S. Application Data (60) Provisional application No. 61/749,055, filed on Jan. 4, 2013.

(51) Int. Cl.
*A47L 13/12* (2006.01)
*A46B 15/00* (2006.01)

(52) U.S. Cl.
CPC ......... *A46B 15/0055* (2013.01); *A46B 15/0081* (2013.01); *A47L 13/12* (2013.01)

(58) Field of Classification Search
CPC ............... A46B 15/00; A46B 15/0055; A46B 15/0081; A47L 13/12
See application file for complete search history.

(56) References Cited

U.S. PATENT DOCUMENTS

| | | | | |
|---|---|---|---|---|
| D242,882 S | * | 1/1977 | Schneider | D4/118 |
| 4,962,561 A | * | 10/1990 | Hamilton | 15/111 |
| D349,407 S | * | 8/1994 | White | D4/118 |
| 6,243,906 B1 | * | 6/2001 | Holliday et al. | 15/111 |
| D451,287 S | * | 12/2001 | Ingram | D4/118 |
| 6,481,041 B1 | * | 11/2002 | Ingram | 15/111 |
| D485,656 S | * | 1/2004 | Anderson et al. | D32/42 |
| D625,521 S | * | 10/2010 | Barnes et al. | D4/118 |

* cited by examiner

*Primary Examiner* — Randall Chin
(74) *Attorney, Agent, or Firm* — Hovey Williams LLP (57) ABSTRACT

A scraper comprising an elongated handle, a blade head at a first end of the elongated handle, and a set of brush bristles at a second end of the elongated handle is provided. The blade head includes first and second scraping edges spaced from each other and extending parallel to the brush bristles. The elongated handle may be held in a right handed orientation in which the first scraping edge may engage a surface to be scraped or a left handed orientation in which the second scraping edge may engage the surface to be scraped for comfortably removing ice, snow, or debris from the surface.

8 Claims, 7 Drawing Sheets

REVERSIBLE SNOWBRUSH SCRAPER

RELATED APPLICATIONS

The present application claims the priority benefit of U.S. Provisional Patent Application Ser. No. 61/749,055 entitled "REVERSIBLE SNOWBRUSH SCRAPER," filed Jan. 4, 2013, the entirety of which is incorporated herein by reference.

BACKGROUND

Vehicle operators often need to remove snow, ice, and frost from their vehicles. Many scrapers, brushes, and other devices have been developed for this purpose. For example, a short ice scraper is often used for scraping ice from vehicle windows and a longer snow broom or brush is often used for brushing snow off of the vehicle body. Conventional snowbrush scrapers combine the scraper and the brush into one apparatus that includes a blade head extending from an end of an elongated handle and a brush located on an opposite end of the elongated handle.

Conventional snowbrush scrapers suffer from a few drawbacks, however. The snowbrush, being located on the elongated handle, interferes with the user's grip of the snowbrush scraper in some orientations. For example, although the snowbrush scraper may be comfortably gripped in a right handed gripping orientation in which the user grips the extended handle near the scraper end with his left hand and near the brush end with his right hand, the user must grip the handle awkwardly to avoid grabbing the snowbrush when holding the snowbrush scraper in a left handed gripping orientation in which the user grips the extended handle near the scraper with his right hand and near the brush end with his left hand. Ambidextrous scrapers exist in which the edge of the scraper extends from the elongated handle perpendicular to the brush, which allows the user to comfortably grip the snowbrush scraper in both a left hand and a right hand orientation with the brush pointing downward. However, this results in the device no longer being substantially flat in one plane, which makes storing the snowbrush scraper difficult. Also, this shape is less appealing to retail stores in which the number of units per inch of shelf space should be maximized.

SUMMARY

The present invention solves the above-described problems and provides a distinct advance in the art of snowbrush scrapers by providing a snowbrush scraper that can be comfortably used in a right or a left handed gripping orientation and that can be conveniently and efficiently shipped, stored, and displayed.

A snowbrush scraper constructed in accordance with a first embodiment of the present invention broadly comprises an elongated handle, a blade head extending from one end of the elongated handle and defining first and second straight edges spaced from each other, and a set of brush bristles extending substantially parallel to the straight edges from an opposite end of the elongated handle. The first scraping edge of the blade head engages the surface to be scraped when the elongated handle is held in a right handed orientation in which the user grips the elongated handle near the blade head with his left hand and near the brush bristles with his right hand with the brush bristles facing away from his right hand. The second scraping edge of the blade head engages the surface to be scraped when the elongated handle is held in a left handed orientation in which the user grips the elongated handle near the blade head with his right hand and near the brush bristles with his left hand with the brush bristles facing away from his left hand.

A snowbrush scraper constructed in accordance with a second embodiment of the present invention broadly comprises an elongated handle, a blade head connected to one end of the elongated handle and defining a scraping edge, an attachment structure that permits the blade head to be shifted between first and second positions, and a set of brush bristles extending from an opposite end of the elongated handle. In the first position of the blade head, the scraping edge of the blade head engages the surface to be scraped when the elongated handle is held in a right handed orientation. The user grips the elongated handle near the blade head with his left hand and near the brush bristles with his right hand with the brush bristles facing away from his right hand when the elongated handle is held in the right handed orientation. In the second position of the blade head, the scraping edge of the blade head engages the surface to be scraped when the elongated handle is held in a left handed orientation. The user grips the elongated handle near the blade head with his right hand and near the brush bristles with his left hand with the brush bristles facing away from his left hand when the elongated handle is held in the left handed orientation.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
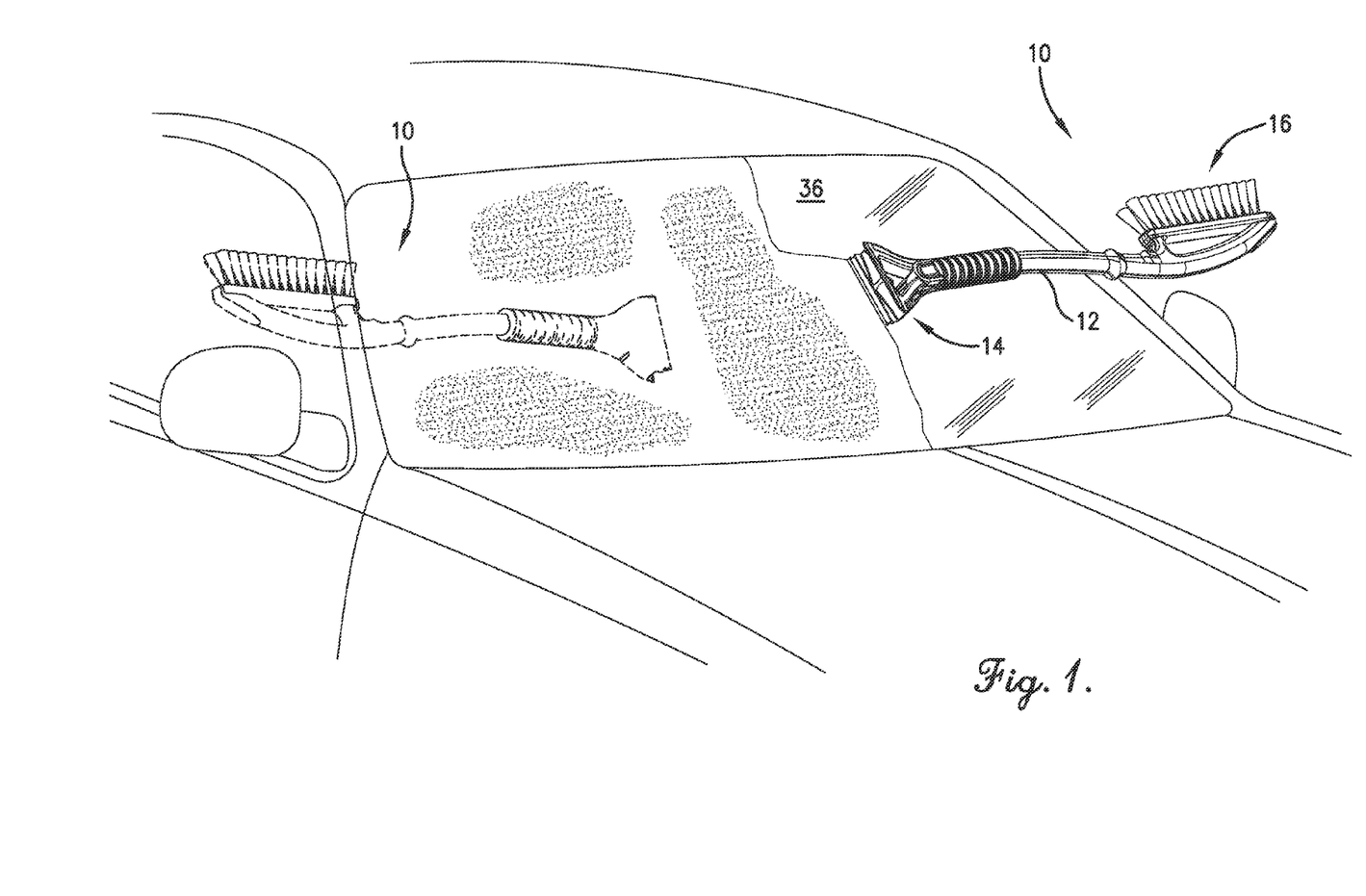
FIG. 1 is a perspective view of a snowbrush scraper constructed in accordance with an embodiment of the present invention and shown in solid lines when used in a right handed gripping orientation and shown in dashed lines when used in a left handed gripping orientation.
Figure 2:
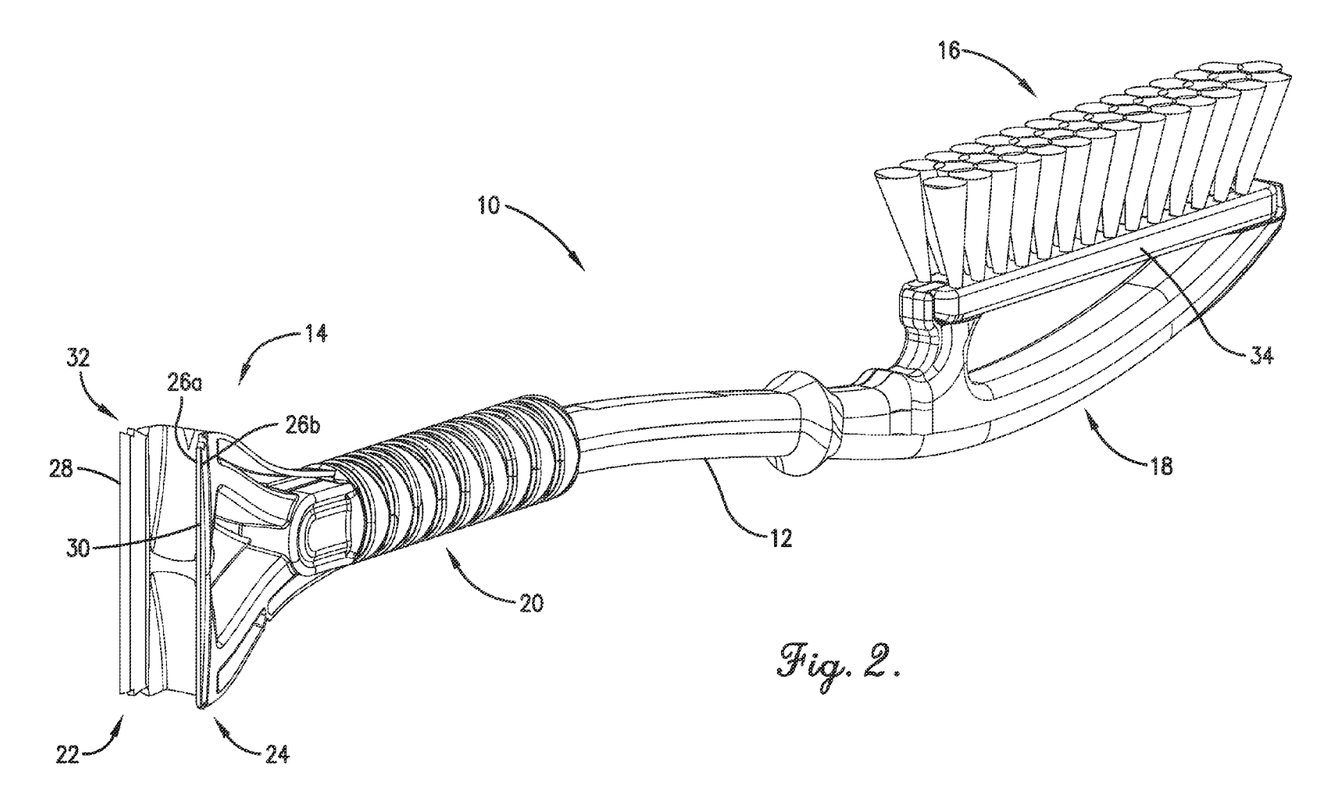
FIG. 2 is an enlarged perspective view of the snowbrush scraper of FIG. 1.

Turning now to the drawing figures, and particularly FIGS. 1 and 2, a snowbrush scraper 10 constructed in accordance with a first embodiment of the invention is illustrated. The snowbrush scraper 10 broadly comprises an elongated handle 12, a blade head 14 extending from a first end of the elongated handle 12, and a set of brush bristles 16 extending from a second end opposite the first end of the elongated handle 12.

The elongated handle 12 may be formed of plastic, metal, wood, or any other rigid material and is approximately 24 inches to approximately 48 inches long and approximately 1 inch to approximately 2.5 inches in diameter. The elongated handle 12 defines a longitudinal axis and may be straight or may be curved or contoured in relation to the longitudinal axis. The elongated handle 12 has a hand gripping portion 18 spaced behind the set of brush bristles 16 on its second end and may include one or more grip pads 20 located near its first and/or second ends. The grip pads 20 may be formed of rubber, foam, or other soft material and may have a plurality of grooves, recesses, notches, or contours for cradling the user's fingers therein.

The blade head 14 may be formed of plastic, metal, wood, or other rigid material and includes two prongs 22, 24 spaced from each other and forming a U or a V shape. The prongs 22, 24 each are substantially $\frac{1}{4}^{th}$ of an inch thick for providing rigidity thereto and each include two blade surfaces (such as blade surfaces 26a,b) that meet each other and terminate at a substantially straight scraping edge (first and second scraping edges 28, 30, respectively) at an angle of 90 degrees or less with respect to each other so as to form a right angle or an acute angle therebetween. The blade surfaces 26a,b may be part of the blade head 14 or may be part of a metal or a plastic blade configured to be attached to or inserted into the blade head 14. The first and second scraping edges 28, 30 are spaced from each other and may extend substantially perpendicular to the longitudinal axis of the elongated handle 12 or may be angled up to approximately 30 degrees in either direction. The first and second scraping edges 28, 30 each may include one or more serrations (such as serrations 32) or notches on one or both of its ends.

The brush bristles 16 extend substantially perpendicular to the longitudinal axis of the elongated handle 12 and substantially parallel to the scraping edges 28, 30 of the blade head 14 near the second end of the elongated handle 12, as shown in FIGS. 1 and 2. The brush bristles 16 may be attached directly to the elongated handle 12 or may extend from a brush head 34 spaced from the elongated handle 12.

The above-described snowbrush scraper 10 provides several advantages over conventional snowbrush scrapers. For example, the snowbrush scraper 10 allows a user to comfortably grasp the snowbrush scraper 10 in multiple equivalent orientations (e.g., left and right snow scraping orientations and left and right ice chipping orientations) when scraping snow, debris, or thick ice off of a surface 36 such as a vehicle windshield or window. Moreover, the snowbrush scraper 10 may be compactly stored when not in use and may be compactly packaged and/or stacked or displayed on a shelf when being shipped or sold.

Specifically, as shown in FIG. 1, the first scraping edge 28 of the blade head 14 may engage the surface 36 for scraping snow, debris, or ice off of the surface 36 when the elongated handle 12 is held in a right handed orientation (solid line in FIG. 1) in which the user grips the elongated handle 12 near its first end with his left hand and near its second end with his right hand with the plurality of bristles 16 extending away from his right hand. The second scraping edge 30 of the blade head 14 may engage the surface 36 for scraping snow, debris, or ice off of the surface 36 when the elongated handle 12 is held in a left handed orientation (dashed line in FIG. 1) in which the user grips the elongated handle 12 near its first end with his right hand and near its second end with his left hand with the plurality of brush bristles 16 extending away from his left hand.

Also, the serrations of the scraping edges 28, 30 (such as serrations 32) may engage the surface 36 for scraping thick ice off of the surface 36 when the elongated handle is held in a left or right handed orientation in which the user grips the elongated handle 12 near its first end with one hand and near its second end with his other hand with the plurality of bristles 16 extending downward.

In addition, the scraping edges 28, 30 of the blade head 14 and the plurality of brush bristles 16 extend substantially parallel to each other resulting in the snowbrush scraper 10 having a narrow width of approximately 1.5 inches or less, which allows the snowbrush scraper 10 to be compactly stored, packaged, and stacked or shelved.

Turning now to FIGS. 3-7, a snowbrush scraper 100 constructed in accordance with a second embodiment of the invention is illustrated. The snowbrush scraper 100 broadly comprises an elongated handle 102, a blade head 104 shiftably connected to a first end of the elongated handle 102, an attachment structure 106 configured to allow the blade head 104 to be shifted between first and second positions, and a set of brush bristles 108 extending from a second end of the elongated handle 102 opposite the first end.

Figure 3:
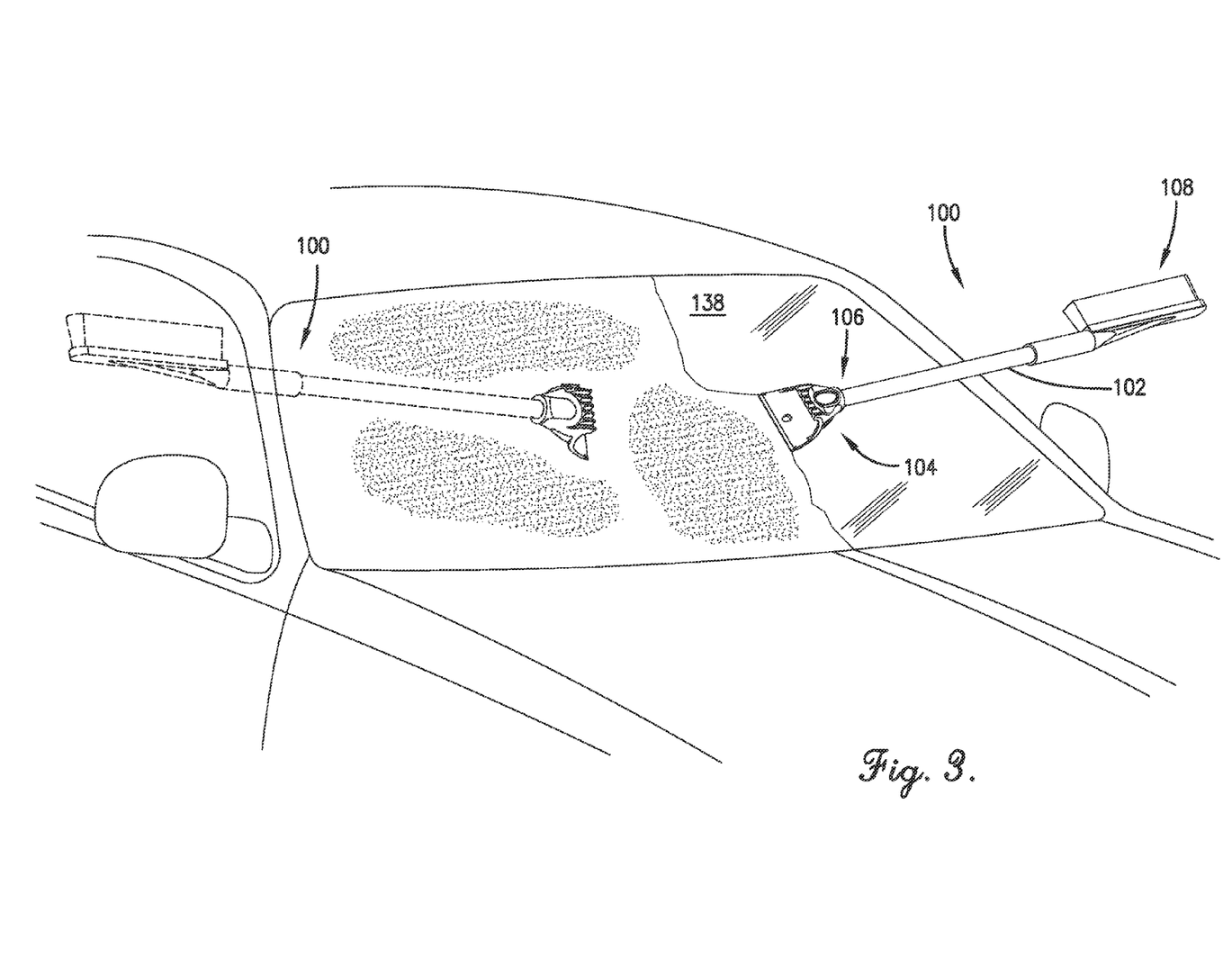
FIG. 3 is a perspective view of a snowbrush scraper constructed in accordance with another embodiment of the present invention and shown in solid lines when used in a right handed gripping orientation and shown in dashed lines when used in a left handed gripping orientation.

The elongated handle 102 may be formed of plastic, metal, wood, or any other rigid material and is approximately 24 inches to approximately 48 inches long and approximately 1 inch to approximately 2.5 inches in diameter. The elongated handle 102 defines a longitudinal axis and may be straight or may be curved or contoured in relation to the longitudinal axis.

The blade head 104 may be formed of plastic, metal, wood, or other rigid material and is substantially $\frac{1}{4}^{th}$ of an inch thick for providing rigidity thereto. The blade head 104 includes two blade surfaces 112a,b that meet each other and terminate at a substantially straight scraping edge 114 at an angle of 90 degrees or less. The blade head 104 also may define a substantially serrated edge 116 spaced from the substantially straight scraping edge 114. The blade surfaces 112a,b may be part of the blade head 104 or may be part of a metal or a plastic blade configured to be attached to or inserted into the blade head 104. The scraping edge 114 may extend substantially perpendicular to the longitudinal axis of the elongated handle 102 or may be angled up to approximately 30 degrees in either direction. The scraping edge 114 may include one or more serrations 118 or notches on one or both of its ends.

Figure 4:
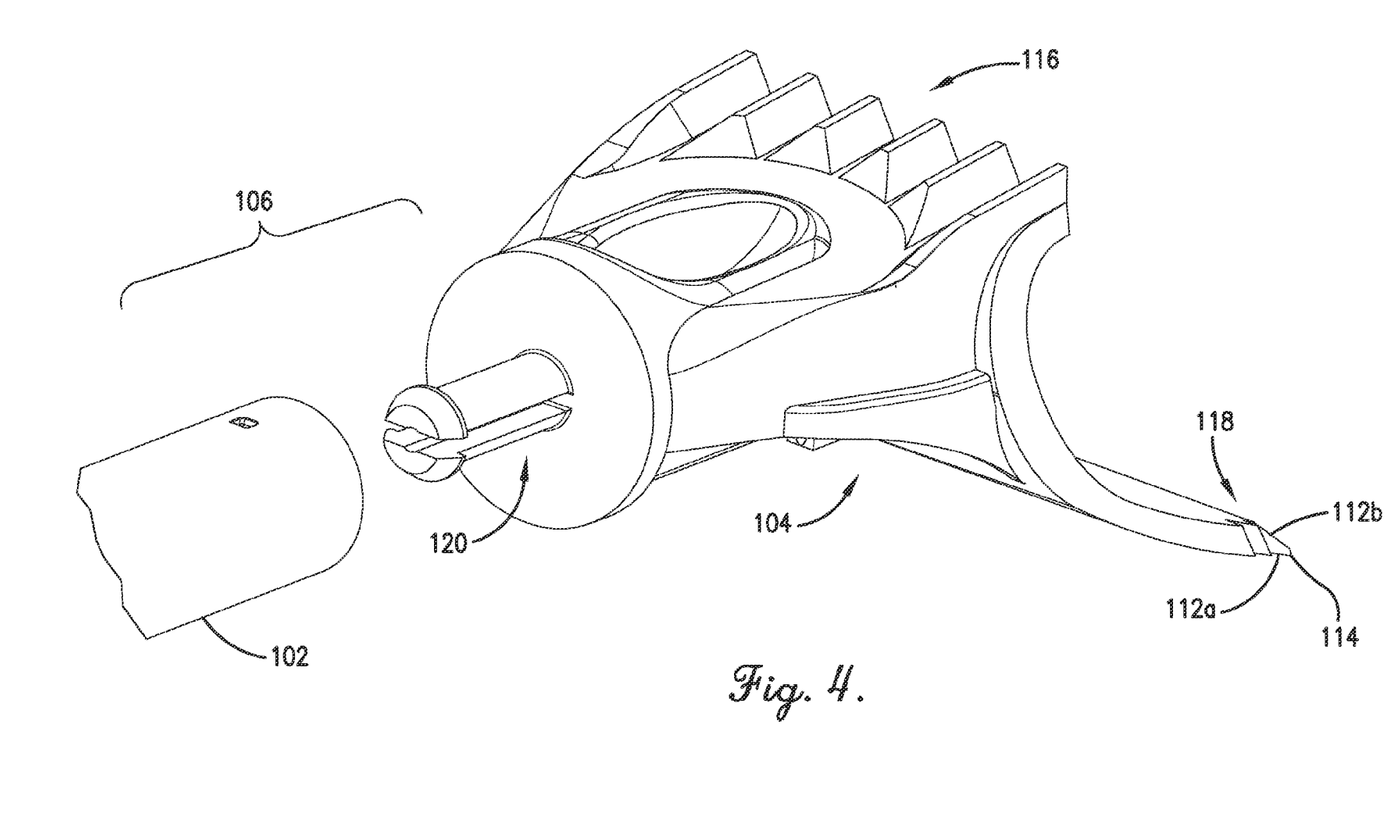
FIG. 4 is an exploded view of the attachment structure of the snowbrush scraper of FIG. 3.
Figure 5:
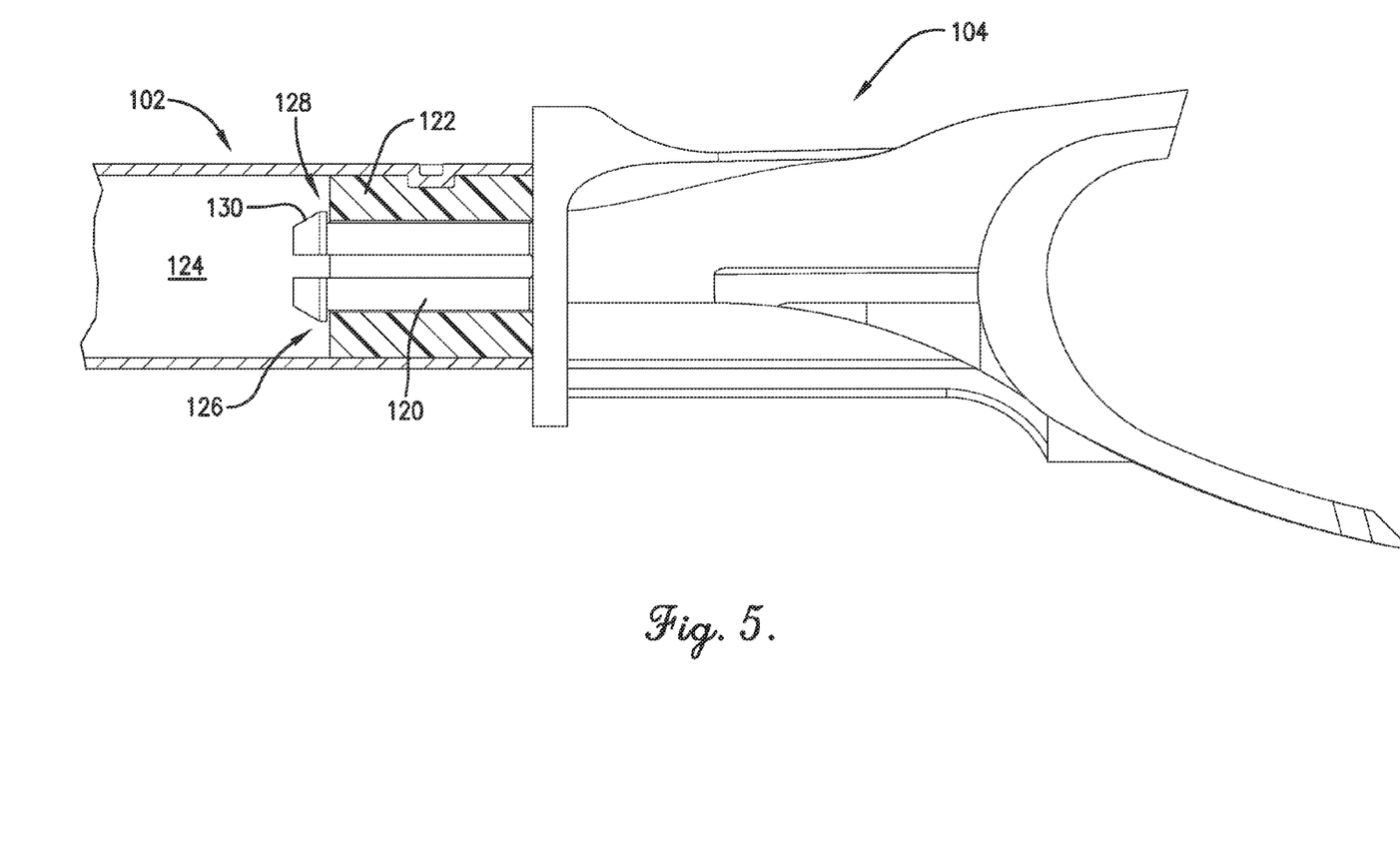
FIG. 5 is a sectional view of the attachment structure of FIG. 4.
Figure 6:
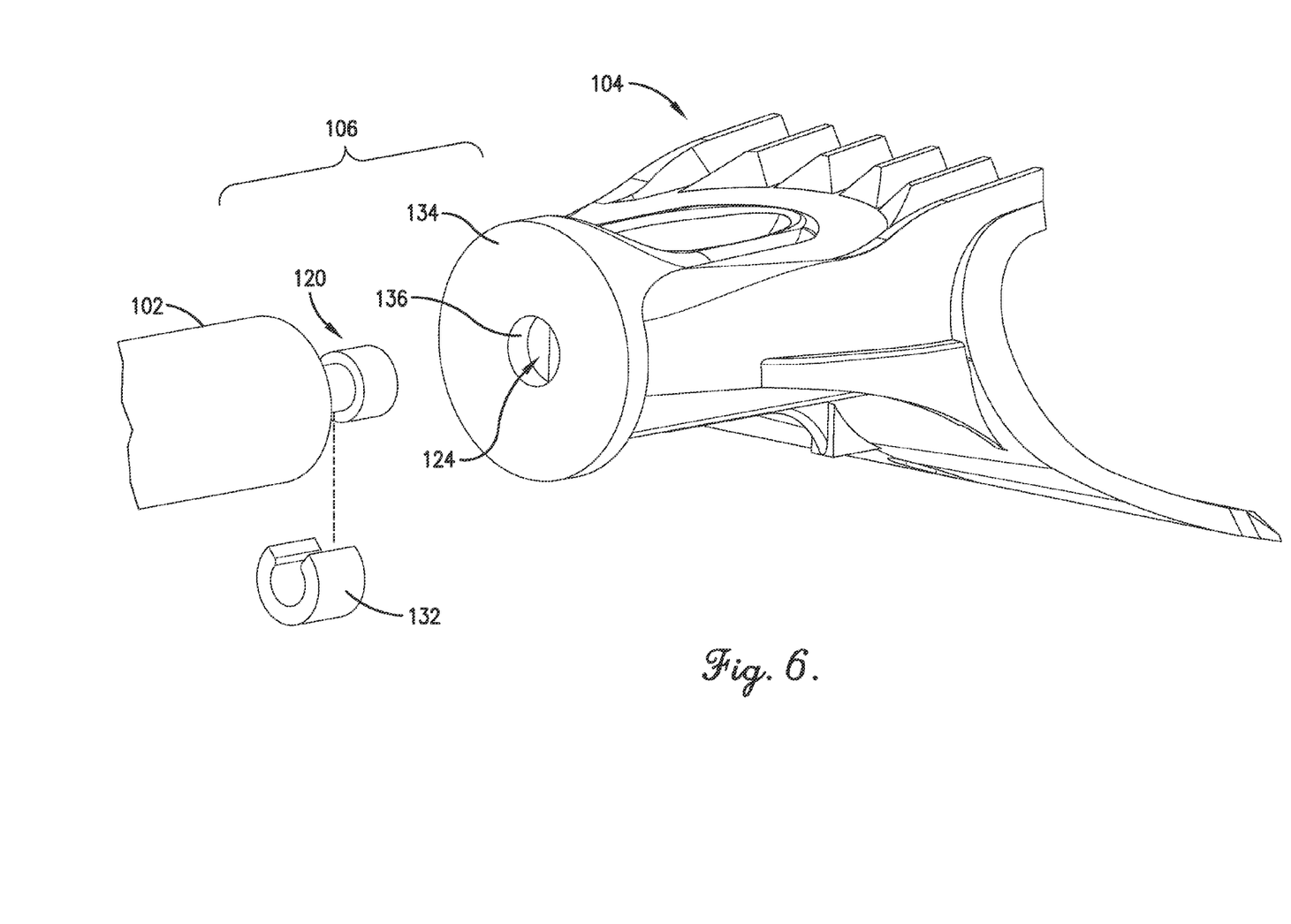
FIG. 6 is an exploded view of an alternative attachment structure of the snowbrush scraper of FIG. 3.
Figure 7:
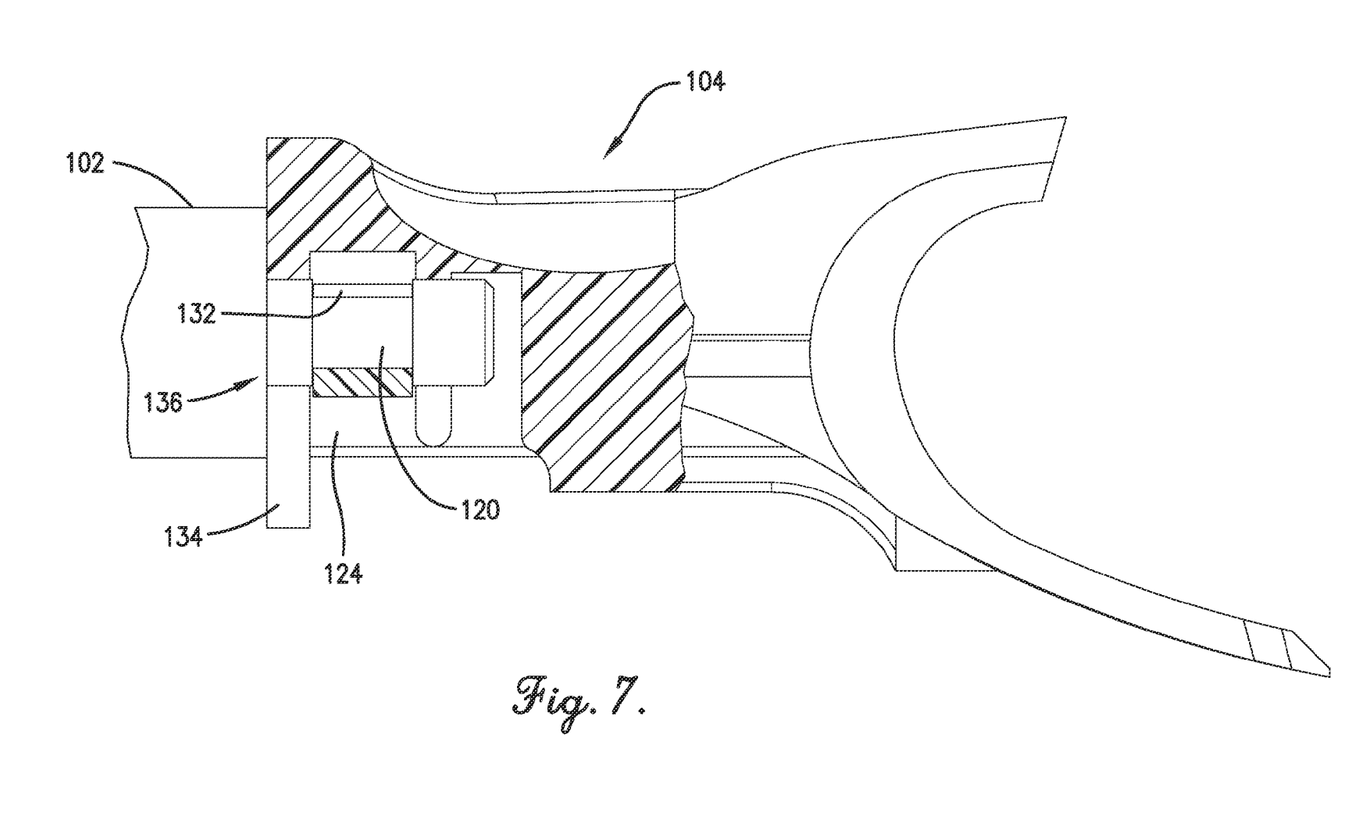
FIG. 7 is a sectional view of the attachment structure of FIG. 6.

The attachment structure 106 is provided for shiftably or rotatably connecting the blade head 104 to the first end of the elongated handle 102 for allowing the blade head 104 to be shifted between first and second positions, as described below. The attachment structure 106 includes a protrusion 120 extending from the blade head 104 and may include a plug 122 or a boss disposed in, attached to, or extending from an end of the elongated handle 102 and defining an open-ended chamber 124 having a narrow neck 126 and a recess 128, a cavity, or an open area at the end of the narrow neck 126, as shown in FIGS. 4 and 5. The protrusion 120 may be a flexible snap-lock tab with a one-way cam end 130 having an effective diameter greater than a diameter of the narrow neck 126 of the plug 122. The flexible snap-lock tab is configured to be flexibly received through the narrow neck 126 and irreversibly received in the recess 128 by interfering with the narrow neck 126 when the flexible snap-lock tab is inserted into the open-ended chamber 124, thus retaining the blade head 104 on the elongated handle 102. Alternatively, the attachment structure 106 may include the protrusion 120 extending from the first end of the elongated handle 102 and the open-ended chamber 124 being defined within a boss 134 of the blade head 104, as shown in FIGS. 6 and 7. The attachment structure 106 may include a clip 132 having a diameter greater than a diameter of the narrow neck 136 of the boss 134. The clip 132 is configured to be interlockingly positioned around the protrusion 120. The clip 132 is further configured to be received in the recess 128 and to interfere with the narrow neck 136 of the boss 134 when the protrusion 120 is inserted into the open-ended chamber 124.

The brush bristles 108 extend substantially perpendicular to the longitudinal axis of the elongated handle 102 near the second end of the elongated handle, as shown in FIG. 3. The brush bristles 108 may be attached directly to the elongated handle 102 or may extend from a brush head 104 spaced from the elongated handle.

The above-described snowbrush scraper 100 provides several advantages over conventional snowbrush scrapers. For example, the snowbrush scraper 100 allows a user to comfortably grasp the snowbrush scraper 100 in multiple equivalent orientations (e.g., left and right snow scraping orientations and left and right ice chipping orientations) when scraping snow, debris, or thick ice off of surface 138 such as a vehicle windshield or window. Moreover, the snowbrush scraper 100 may be compactly stored when not in use and may be compactly packaged and/or stacked or displayed on a shelf when being shipped or sold.

Specifically, as shown in FIG. 3, the substantially straight scraping edge 114 of the blade head 104 may engage the surface 138 when the blade head 104 is shifted with respect to the longitudinal axis of the elongated handle 102 between a first position and a second position approximately 180 degrees from the first position. In the first position of the blade head 104, the elongated handle 102 may be held in a right handed orientation (solid line in FIG. 3) in which the user grips the elongated handle 102 near its first end with his left hand and near its second end with his right hand with the plurality of bristles 108 extending away from his right hand. In the second position of the blade head 104, the elongated handle 102 may be held in a left handed orientation (dashed line in FIG. 3) in which the user grips the elongated handle 102 near its first end with his right hand and near its second end with his left hand with the plurality of brush bristles 108 extending away from his left hand.

Also, the substantially serrated edge 116 may engage the surface 138 for scraping thick ice off of the surface 138 when the blade head 104 is shifted between the first and second positions. In the first position of the blade head 104, the elongated handle 102 may be held in a left handed orientation in which the user grips the elongated handle 102 near its first end with his right hand and near its second end with his left hand with the plurality of bristles 108 extending away from his left hand. In the second position of the blade head 104, the elongated handle 102 may be held in a right handed orientation in which the user grips the elongated handle 102 near its first end with his left hand and near its second end with his right hand with the plurality of brush bristles 108 extending away from his right hand.

Alternatively, the serrations 118 of the substantially straight scraping edge 114 may engage the surface 138 for scraping thick ice off of the surface 138 when the blade head 104 is shifted to a third position in which the substantially straight scraping edge 114 extends substantially perpendicular to the plurality of brush bristles 108.

In addition, the snowbrush scraper 100 may be compactly stored, packaged, and stacked or shelved when the blade head 104 is in the first or the second position in which the substantially straight scraping edge 114 extends substantially parallel with the plurality of brush bristles 108.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A scraper for removing ice, snow, or frost from a surface, the scraper comprising:
   an elongated handle for gripping and for applying leverage to the surface, the elongated handle extending at least partially along a plane;
   a blade head disposed near a first end of the elongated handle, the blade head defining a first substantially straight scraping edge entirely offset from the plane on a first side of the plane and a second substantially straight scraping edge entirely offset from the plane on a second side of the plane such that the first and second substantially straight scraping edges are offset from each other on opposite sides of the plane, the blade head forming a two-pronged U shape with each prong of the U shape including a first surface and a second surface that meet each other and terminate at one of the scraping edges at an angle of 90 degrees or less with respect to each other so as to form a right angle or an acute angle therebetween; and
   a plurality of bristles disposed near a second end of the elongated handle opposite the first end of the elongated handle and extending substantially parallel to the plane for brushing snow and debris off of the surface,
   the first substantially straight scraping edge of the blade head being configured to engage the surface when the elongated handle is held in a first orientation in which a user grips the elongated handle near its first end with his left hand and near its second end with his right hand with the plurality of bristles extending away from his right hand, and the second substantially straight scraping edge of the blade head being configured to engage the surface when the elongated handle is held in a second orientation in which the user grips the elongated handle near its first end with his right hand and near its second end with his left hand with the plurality of bristles extending away from his left hand.

2. The scraper of claim 1, wherein each prong of the U shape is at least $\frac{1}{4}^{th}$ of an inch thick for providing rigidity thereto.

3. The scraper of claim 1, wherein the blade head comprises a first and a second metal blade configured to be inserted into the prongs of the U shape.

4. The scraper of claim 1, wherein the blade head is a single piece of molded plastic.

5. The scraper of claim 1, wherein the blade head includes two outwardly curving prongs.

6. The scraper of claim 1, wherein at least one of the substantially straight scraping edges includes a first serrated section configured to remove ice from the surface when the elongated handle is held in a third orientation in which the scraper is rotated approximately 90 degrees around a longitudinal axis of the elongated handle in relation to the first or the second orientations.

7. The scraper of claim 6, wherein at least one of the substantially straight scraping edges includes a second serrated section opposite the first serrated section and configured to remove ice from the surface when the elongated handle is held in a fourth orientation in which the scraper is rotated approximately 180 degrees around the longitudinal axis of the elongated handle in relation to the third orientation.

8. A scraper for removing ice, snow, or frost from a surface, the scraper comprising:
- an elongated handle for gripping and for applying leverage to the surface, the elongated handle extending at least partially along a plane;
- a blade head disposed near a first end of the elongated handle, the blade head defining a first substantially straight scraping edge entirely offset from the plane on a first side of the plane and a second substantially straight scraping edge entirely offset from the plane on a second side of the plane such that the first and second substantially straight scraping edges are offset from each other on opposite sides of the plane; and
- a plurality of bristles disposed near a second end of the elongated handle opposite the first end of the elongated handle and extending substantially parallel to the plane for brushing snow and debris off of the surface,
- the first substantially straight scraping edge of the blade head being configured to engage the surface when the elongated handle is held in a first orientation in which a user grips the elongated handle near its first end with his left hand and near its second end with his right hand with the plurality of bristles extending away from his right hand, and
- the second substantially straight scraping edge of the blade head being configured to engage the surface when the elongated handle is held in a second orientation in which the user grips the elongated handle near its first end with his right hand and near its second end with his left hand with the plurality of bristles extending away from his left hand.

\* \* \* \* \*